United States Patent
Qi et al.

(10) Patent No.: US 9,233,350 B2
(45) Date of Patent: Jan. 12, 2016

(54) START-UP METHOD FOR REACTION-REGENERATION UNIT USED TO PREPARE LIGHT OLEFINS FROM METHANOL

(71) Applicants: China Petroleum & Chemical Corporation, Beijing (CN); Shanghai Research Institute of Petrochemical Technology, SINOPEC, Shanghai (CN)

(72) Inventors: Guozhen Qi, Shanghai (CN); Siqing Zhong, Shanghai (CN); Zhinan Yu, Shanghai (CN); Yongming Jin, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 221 days.

(21) Appl. No.: 13/736,892

(22) Filed: Jan. 8, 2013

(65) Prior Publication Data

US 2013/0178681 A1 Jul. 11, 2013

(30) Foreign Application Priority Data

Jan. 10, 2012 (CN) .............................. 201210005496

(51) Int. Cl.
*C07C 1/22* (2006.01)
*B01J 8/00* (2006.01)
*B01J 8/18* (2006.01)
*B01J 8/26* (2006.01)

(52) U.S. Cl.
CPC ................ B01J 8/008 (2013.01); B01J 8/1872 (2013.01); B01J 8/26 (2013.01)

(58) Field of Classification Search
USPC .................................. 585/638, 639, 640, 641
See application file for complete search history.

(56) References Cited

U.S. PATENT DOCUMENTS

| 4,499,327 | A | 2/1985 | Kaiser |
| 6,166,282 | A | 12/2000 | Miller |
| 7,531,705 | B2 * | 5/2009 | Lattner et al. ................. 585/639 |

FOREIGN PATENT DOCUMENTS

| CN | 1723262 A | 1/2006 |
| CN | 101130466 A | 2/2008 |
| CN | 101327447 A | 12/2008 |
| CN | 101333142 A | 12/2008 |

* cited by examiner

*Primary Examiner* — In Suk Bullock
*Assistant Examiner* — Sharon Pregler
(74) *Attorney, Agent, or Firm* — Novick, Kim & Lee, PLLC; Allen Xue

(57) ABSTRACT

The invention provides a start-up method for a reaction-regeneration unit for preparing light olefins from methanol, which comprises: (a) heating a regenerator with an auxiliary combustion chamber and a reactor with a start-up furnace; (b) charging a catalyst into the regenerator and reactor; (c) closing a spent catalyst slide valve and a regenerated catalyst slide valve after the reactor reaches about 350° C. or more; (d) feeding methanol to the reactor after the dense phase stage of the regenerator reaches about 350° C. or more; (e) opening the spent catalyst slide valve and introducing a carbon deposited catalyst from the reactor to the regenerator after the dense phase stage reaches about 400° C. or more and the average amount of carbon deposits on the catalyst in the reactor reaches about 2.5% or more; (f) raising the regenerator to above about 580° C.; and (g) stopping the start-up furnace and auxiliary combustion chamber.

11 Claims, 1 Drawing Sheet

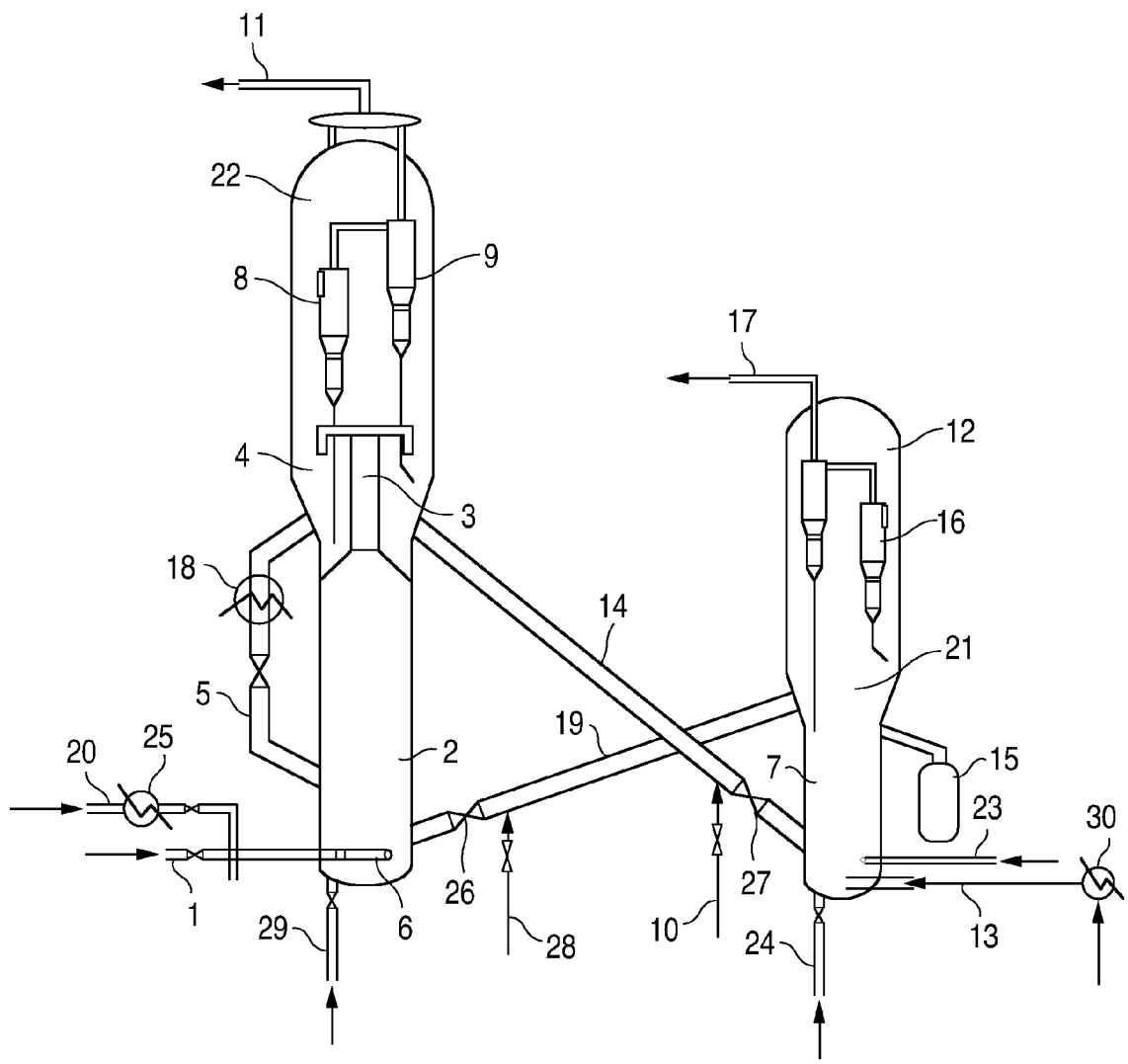

START-UP METHOD FOR REACTION-REGENERATION UNIT USED TO PREPARE LIGHT OLEFINS FROM METHANOL

CROSS REFERENCE TO RELATED APPLICATION

The application claims priority to Chinese patent application No. 201210005496.2 filed on Jan. 10, 2012, which is hereby incorporated by reference herein in its entirety.

TECHNICAL FIELD

The present invention relates to a start-up method for a reaction-regeneration unit used to prepare light olefins from methanol.

BACKGROUND ART

Light olefins, i.e., ethylene and propylene, are two important basic chemical materials with an increasing demand. Generally, ethylene and propylene are produced from petroleum. Due to limited supply and higher price of petroleum resources, the cost of producing ethylene and propylene from petroleum resource is continuously increasing. Recently, techniques for preparing ethylene and propylene by conversion converting of petroleum alternatives have been developed. Oxygen-containing compounds, such as alcohols (for example, methanol and, ethanol), ethers (for example, dimethyl ether and, methyl ethyl ether), and esters (for example, dimethyl carbonate and, methyl formate) and the like, which can be converted from petroleum alternatives, such as coal, natural gas, and biomass and the like. Some oxygen-containing compounds, such as methanol, can be produced from coal or natural gas on a large scale, reaching to production scales of, for example, in millions of tons. Due to the abundant supply of such oxygen-containing compounds, in combination with the more economically efficient technique of olefin production by conversion converting from petroleum alternatives, the Oxygenate To Olefins processes (OTO), such as the Methanol to Olefins processes (MTO), have drawn more and more attention. Examples of such processes are disclosed in U.S. Pat. Nos. 4,499,327 and 6,166,282, and Chinese Patent No. CN1723262.

The reaction-regeneration system for preparing light olefins from methanol is fundamentally different from the traditional reaction-regeneration system for catalytic cracking. The difficulty for start-up of MTO process is also greater than that of catalytic cracking. Moreover, during the start-up process for the traditional reaction-regeneration system a burning oil is generally sprayed into the regenerator, which may cause damage to the catalysts. The present invention provides a new start-up method for a reaction-regeneration unit used to prepare light olefins from methanol, which provides a solution to the above problem.

SUMMARY OF THE INVENTION

The invention provides a novel start-up method for a reaction-regeneration unit used to prepare light olefin from methanol, which is mainly to solve the problems occurred in the prior art including a long start-up period, a severe degree of damage to catalysts and susceptibility to blockage of the spent catalyst slope tube. The method provides the following advantages when used in the production of light olefins: a shorter start-up period, a lower degree of damage to catalysts and no blockage of the spent catalyst slope tube.

In one embodiment, the present invention adopts the following technical solution: a start-up method for a reaction-regeneration unit used to prepare light olefins from methanol, comprising the following steps: (a) heating air with an auxiliary combustion chamber and then introducing the air into a regenerator to heat the dense phase stage of the regenerator to a temperature of from about 350 to about 550° C., and meanwhile heating a water vapor with a start-up furnace to a temperature of from about 400 to about 550° C. and then introducing the water vapor into a reactor; (b) charging a catalyst into the regenerator through a regenerator large-scale catalyst feeding line, charging a catalyst into the reactor through a reactor large-scale catalyst feeding line, further heating the reactor with the water vapor heated by the start-up furnace and further heating the regenerator with the air heated by the auxiliary combustion chamber; (c) closing a spent catalyst slide valve and a regenerated catalyst slide valve after the temperature of the reactor reaches about 350° C. or more, introducing a back-flushing gas before the spent catalyst slide valve and the regenerated catalyst slide valve to ensure that the density of the catalyst in the slope tube before the spent catalyst slide valve and the regenerated catalyst slide valve is less than about 100 kg/m$^3$, and loosening the spent catalyst slide valve and the regenerated catalyst slide valve every about 10 minutes-about 60 minutes; (d) feeding methanol into the reactor after the temperature of a dense phase stage of the regenerator reaches about 350° C. or more, establishing an inner circulation of catalyst in the reactor via an outer catalyst circulating tube, and forming carbon deposits on the catalyst; (e) opening the spent catalyst slide valve, and reducing or stopping the back-flushing gas before the spent catalyst slide valve after the temperature of the dense phase stage of the regenerator reaches about 400° C. or more and the average amount of carbon deposits on the catalyst in the reactor reaches about 2.5% or more, to ensure the carbon deposited catalyst to enter the regenerator from the reactor through a spent catalyst slope tube, and meanwhile opening the regenerated catalyst slide valve, and reducing or stopping the back-flushing gas before the regenerated catalyst slide valve, to establish step by step a circulation of catalyst between the reactor and regenerator; (f) burning the carbon deposits on the catalyst in the regenerator to release heat so as to heat the regenerator to a temperature above about 580° C. In one embodiment, the present invention comprises (g) stopping the start-up furnace and the auxiliary combustion chamber.

In one embodiment of the present invention, the medium for combustion in the auxiliary combustion chamber is selected from the group consisting of diesel oil and fuel gas. In one embodiment of the present invention, the catalyst used comprises an aluminosilicophosphate molecular sieve. In one embodiment of the present invention, the back-flushing gas is at least one of water vapor, nitrogen and fuel gas.

The fuel gas used in the present invention mainly comprises methane, hydrogen, ethylene, propylene and so on.

The start-up method for a reaction-regeneration system as described with reference to the attached drawing and examples provided herein can be carried out under operating conditions as desired according to the size, configuration and the like of the actual reaction-regeneration system, which are not limited to the specific parameters as mentioned in the examples provided herein.

As a backup device, the burning oil pipeline as shown in the attached drawing of the invention is used to provide heat to the regenerator so as to prevent the temperature of the regenerator from declining dramatically in case of an accident, a shutdown and the like.

Since the coke yield in the production of light olefins from methanol is relatively tow and methanol has a lower molecular weight, the reaction-regeneration system used for the production has the characteristic of "big reactor, small regenerator", which is fundamentally different from the characteristic of "small reactor, big regenerator" in the reaction-regeneration system for traditional catalytic cracking, and which also makes the start-up method for the reaction-regeneration system for the production of light olefins from methanol different from and more difficult than that of the start-up method for traditional circulating fluidized beds. Moreover, during the start-up process for traditional reaction-regeneration systems a burning oil is sprayed into the regenerator, which will damage the catalyst. According to the method of the invention, the reactor and the regenerator are charged with the catalyst separately, the regenerator is heated with the auxiliary combustion chamber, and the reactor is heated with the water vapor heated by the start-up furnace. The inventors have found through research that carbon deposits on catalysts used in the production of light olefins from methanol can be burned at a temperature about 400° C. or more with releasing heat. When the feeding conditions in the reactor are satisfied, the spent catalyst slide valve and the regenerated catalyst slide valve are closed, the regenerator is further heated with the auxiliary combustion chamber, and methanol is introduced into the reactor to initiate the predeposition of carbon on the catalyst inside the reactor. When the temperature of the regenerator reaches about 400° C. or more, the carbon deposited catalyst in the reactor is circulated to the regenerator and the temperature of the regenerator is further raised by the heat released from the combustion of the carbon deposits. In addition, the method of invention comprises a step of introducing a back-flushing gas before the spent catalyst slide valve and the regenerated catalyst slide valve to reduce the density of the catalyst before the slide valves of the spent catalyst slope tube and the regenerator slope tube. It is preferable to introduce a sufficient amount of back-flushing gas to prevent a substantive amount of catalyst from entering the spent catalyst slope tube before the opening of the slide valve thereof so that a blockage will not occur in the spent catalyst slope tube. Hence, according to the method of the invention, the reactor and regenerator are charged with the catalyst separately so that the loading rate of the catalyst can be greatly increased and the tune needed for start-up can be reduced. In addition, during the start-up process, no burning oil is sprayed so that the damage to catalysts can be eliminated. Furthermore, the problem of catalysts blockage in the slope tube can be fundamentally avoided.

According to one embodiment of the present invention, the medium for combustion the auxiliary combustion chamber is selected from the group consisting of diesel oil and fuel gas; the catalyst used comprises an aluminosilicophosphate molecular sieve; and the back-flushing gas is at least one of water vapor, nitrogen and fuel gas. The start-up period is basically between about 2 and about 4 hours and the average yield of light olefins is 82.48% by weight during a continuous operation for 60 days, which represents a good technical effect.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

As used herein, the term "comprising" means that other steps and ingredients that do not affect the final result can be added. This term encompasses the terms "consisting of" and "consisting essentially of". The term "consisting essentially of" means that the composition or method may include additional ingredients and/or steps, but only if the additional ingredients and/or steps do not materially alter the basic and novel characteristics of the claimed process or method.

The term "method" or "process" refers to manners, means, techniques and procedures for accomplishing a given task including, but not limited to, those manners, means, techniques and procedures either known to, or readily developed from known manners, means, techniques and procedures by practitioners of the chemical and chemical engineering.

As used herein, the singular form "a," "an," and "the" include plural references unless the context clearly dictates otherwise.

As used herein, the term "about" refers to ±10%.

BRIEF DESCRIPTION OF THE DRAWINGS

FIG. 1 illustrates the schematic diagram of an exemplary embodiment of the technical solution of the present invention.

DETAILED DESCRIPTION

In FIG. 1, 1 is a feedstock pipeline of the reactor; 2 is a reaction zone of the reactor; 3 is a fast gas-solid separation zone; 4 is a steam stripping zone; 5 is an outer circulating slope tube of the reactor; 6 is a raw material distribution plate; 7 is a dense phase stage of the regenerator; 8 is a gas-solid cyclone separator of the reactor; 9 is a separation zone of the reactor; 10 is a pipeline for introducing the back-flushing gas before the spent catalyst slide valve; 11 is an outlet pipeline for the product gas; 12 is a dilute phase stage of the regenerator; 13 is an inlet pipeline for the regenerating medium; 14 is a spent catalyst slope tube; 15 is an outer heat receiver of the regenerator; 16 is a gas-solid cyclone separator of the regenerator; 17 is an outlet pipeline for the flue gas of the regenerator; 18 is an outer heat receiver of the reactor; 19 is a regenerated catalyst slope tube; 20 is a pipeline for introducing steam into the reactor; 21 is a regenerator; 22 is a reactor; 23 is an inlet pipeline for the burning oil; 24 is a large-scale catalyst feeding line of the regenerator; 25 is a start-up furnace; 26 is a regenerated catalyst slide valve; 27 is a spent catalyst slide valve; 28 is a pipeline for introducing the back-flushing gas before the regenerated catalyst slide valve; 29 is a large-scale catalyst feeding line of the reactor; and 30 is an auxiliary combustion chamber.

The stream comprising the methanol raw material is fed into the reaction zone 2 of the reactor 22 via the feedstock pipeline 1 and contacted with the molecular sieve catalyst to react and produce a gas product containing light olefins. The spent catalyst is carried by the gas product through the fast gas-solid separation zone 3 and then into the reactor separation zone 9. Most of the catalyst separated in the fast gas-solid separation zone 3 is sent to the steam stripping zone 4, and the gas product together with the unseparated catalyst from the fast gas-solid separation zone is sent to the cyclone separator 8 for further separation. The catalyst separated are recycled to the steam stripping zone 4 via the dipleg of the cyclone separator 8, and the gas product is sent to a subsequent separation stage via outlet pipeline 11. The spent catalyst as separated in the fast gas-solid separation zone 3 and the cyclone separator 8 are divided into two parts after the steam stripping, in which one part is recycled to the bottom of the reaction zone 2 via the outer catalyst circulating slope tube 5; and the other part is sent to the dense phase stage 7 of the regenerator 21 via the spent catalyst slope tube 14, where the carbon deposits (i.e., coke) are burned and the catalyst are regenerated. The flue gas generated from the combustion of the coke is sent to a subsequent energy recovery system via the flue gas outlet pipeline 17 after passing through the cyclone separator 16. The regenerated catalyst is recycled to the reaction zone 2 via the regenerated catalyst slope tube 19.

The invention is further illustrated with reference to the following example but is not limited thereto.

EXAMPLES

Example 1

In the reaction-regeneration system for preparing light olefins from methanol as shown in FIG. 1, the reactor was a fast fluidized bed; the regenerator is a dense phase bed; the catalyst was SAPO-34 molecular sieve; the feed rate of methanol was 4.2 ton/hour; the reactor has an overall height of 28.7 meters; and the regenerator has an overall height of 24.3 meters. A fuel gas was introduced into the auxiliary combustion chamber and ignited to heat the regenerating air, and the heated regenerating air was then sent to the regenerator to heat it to a temperature of about 450° C. The start-up furnace was started to heat a water vapor to a temperature of 500° C., which was then introduced into the reactor to heat it to a temperature of about 415° C. The catalyst was charged into the regenerator via the regenerator large-scale catalyst feeding line and was charged into the reactor via the reactor large-scale catalyst feeding line. The reactor was further heated with the water vapor heated by the start-up furnace to further raise its temperature and the regenerator was further heated with the air heated by the auxiliary combustion chamber to further raise its temperature. After the temperature of the reactor reached 375° C., the spent catalyst slide valve and the regenerated catalyst slide valve were closed and a back-flushing gas, which was nitrogen, was introduced before the spent catalyst slide valve and the regenerated catalyst slide valve, so that the density of the catalyst in the slope tube before the spent catalyst slide valve and the regenerated catalyst slide valve was controlled to be about 50 kg/m³, and the spent catalyst slide valve and the regenerated catalyst slide valve were loosened every 30 minutes to prevent the slide valves from being stuck. After the temperature of the dense phase stage of the regenerator reached 360° C., methanol was fed into the reactor, an inner circulation of the catalyst in the reactor was established through the outer catalyst circulating tube, and carbon deposits was formed on the catalyst. After the temperature of the dense phase stage of the regenerator reached 450° C. and the average amount of carbon deposits on the catalyst in the reactor reached 3.0%, the spent catalyst slide valve was opened while the back-flushing gas before the spent catalyst slide valve was reduced to ensure the transfer of the carbon deposited catalyst from the reactor to the regenerator through the spent catalyst slope tube, and meanwhile the regenerated catalyst slide valve was opened while the back-flushing gas before the regenerated catalyst slide valve was reduced, so that a circulation of catalyst was gradually established between the reactor and the regenerator. The carbon deposits on the catalyst were burned in the regenerator to releases heat, so that the temperature of the regenerator was slowly raised to 650° C. After a stable circulation of the catalyst between the reactor and the regenerator was established, the temperature of the reactor was controlled steadily at 480° C., and the temperature of the regenerator was controlled steadily at 650° C., the start-up furnace and the auxiliary combustion chamber were stopped.

The whole start-up process lasts about 2.5 hours. During a continuous operation of 60 days, an average yield of light olefins of 82.48% by weight was obtained.

Obviously, the following objectives can be achieved by using the method of the invention: shortening the start-up period, eliminating the need for spraying a burning oil, reducing the catalyst damage degree, and preventing the blockage of the spent catalyst slope tube. Thus, the method of the invention provides prominent technical advantages and can be used in industrial production of light olefins.

The invention claimed is:

1. A method for starting-up a process for producing light olefins from methanol in a reaction-regeneration unit, comprising the following steps:

preheating the reaction-regeneration unit having a reactor and a regenerator prior to introducing a methanol-containing feedstock into the reactor, wherein the preheating step comprises steps (a), (b), and (c):

(a) heating the regenerator using hot air until a dense phase stage of the regenerator reaches a temperature in a range from about 350° C. to about 550° C., and heating the reactor using a superheated steam having a temperature of about 400° C. to about 550° C.;

(b) charging a first portion of a catalyst into the regenerator and charging a second portion of the catalyst into the reactor;

(c) closing a spent catalyst slide valve in a spent catalyst slope tube and a regenerated catalyst slide valve in a regenerated catalyst slope tube when the temperature of the reactor reaches at least about 350° C.;

injecting a first back-flushing gas into the spent catalyst slope tube so that a density of the catalyst in the spent catalyst slope tube is less than about 100 kg/m³; and injecting a second back-flushing gas into the regenerated catalyst slope tube so that a density of the catalyst in the regenerated catalyst slope tube is less than about 100 kg/m³;

(d) introducing the methanol-containing feedstock into the reactor when a dense phase stage of the regenerator reaches a temperature of at least about 350° C.; establishing a circulation of the catalyst in the reactor; and forming carbon deposits on the catalyst;

(e) establishing a circulation of the catalyst between the reactor and the regenerator when a temperature of the dense phase stage of the regenerator reaches at least about 400° C. and an average amount of carbon deposits on the catalyst in the reactor reaches at least about 2.5%; and (f) burning the carbon deposits on the catalyst in the regenerator to release heat so as to heat the regenerator to a temperature above about 580° C.

2. The method according to claim 1, wherein the hot air is heated in an auxiliary combustion chamber and the superheated steam is heated in a start-up furnace.

3. The method according to claim 1, wherein a fuel for combustion in the auxiliary combustion chamber is diesel oil, fuel gas, or a mixture thereof.

4. The method according to claim 1, wherein the catalyst comprises an aluminosilicophosphate molecular sieve.

5. The method of claim 1, wherein the first back-flushing gas is injected into the spent catalyst slope tube upstream of the spent catalyst slide valve and the second back-flushing gas is injected into the regenerated catalyst slope tube upstream of the regenerated catalyst slide valve.

6. The method of claim 1, wherein the first back-flushing gas and the second back-flushing gas is independently chosen from stream, nitrogen, fuel gas, or a combination thereof.

7. The method according to claim 1, wherein step (e) further comprises the following sub-steps:
   opening the spent catalyst slide valve;
   reducing or stopping the first back-flushing gas so as to allow the carbon deposited catalyst from the reactor to enter the regenerator through the spent catalyst slope tube;
   opening the regenerated catalyst slide valve; and
   reducing or stopping the second back-flushing gas so as to allow the regenerated catalyst from the regenerator to enter the reactor through the regenerated catalyst slope tube.

8. The method according to claim 1, wherein in step (d) the circulation of the catalyst in the reactor comprises circulating a portion of the catalyst through an outer circulating tube having an inlet and an outlet connected to the reactor.

9. The method according to claim 8, wherein the outer circulating tube is configured to receive heat from an external source.

10. The method according to claim 2, further comprising step (g):
    (g) shutting down the start-up furnace and the auxiliary combustion chamber when the reactor reaches a temperature of at least about 480° C. and the regenerator reaches a temperature of at least about 650° C.

11. The method according to claim 10, wherein steps (a) to (g) are completed in about two hours to about four hours.

\* \* \* \* \*